US008860552B2

(12) United States Patent
Bahou

(10) Patent No.: US 8,860,552 B2
(45) Date of Patent: Oct. 14, 2014

(54) FLEXIBLE STRAPS HAVING EMBEDDED RFID READER ANTENNA MODULES

(76) Inventor: Azdine Bahou, Marseilles (FR)

( * ) Notice: Subject to any disclaimer, the term of this patent is extended or adjusted under 35 U.S.C. 154(b) by 869 days.

(21) Appl. No.: 13/121,189

(22) PCT Filed: Sep. 29, 2009

(86) PCT No.: PCT/FR2009/051839
§ 371 (c)(1),
(2), (4) Date: Jun. 13, 2011

(87) PCT Pub. No.: WO2010/034957
PCT Pub. Date: Apr. 1, 2010

(65) Prior Publication Data
US 2011/0232849 A1    Sep. 29, 2011

(30) Foreign Application Priority Data
Sep. 29, 2008    (FR) ...................................... 08 05326

(51) Int. Cl.
H04Q 5/22      (2006.01)
G08B 13/14    (2006.01)
G08B 5/22      (2006.01)
G05B 19/00    (2006.01)
H04B 7/00      (2006.01)
G01P 15/00    (2006.01)
H01Q 1/22      (2006.01)
H01Q 1/12      (2006.01)
G06Q 10/08    (2012.01)

(52) U.S. Cl.
CPC ............. G06Q 10/08 (2013.01); H01Q 1/2208 (2013.01); H01Q 1/1207 (2013.01)
USPC ....... 340/10.1; 340/10.2; 340/572.1; 340/8.1; 340/568.1; 343/777; 343/758; 343/866; 343/767; 455/41.1; 455/41.2; 455/562.1; 455/575.7; 342/368; 342/463; 73/510; 700/214; 700/215; 700/217

(58) Field of Classification Search
USPC ................... 340/10.1–9, 572.1–8, 8.1, 568.1; 343/777, 758; 455/41.1, 41.2, 562.1, 455/575.2; 342/368, 463
See application file for complete search history.

(56) References Cited

U.S. PATENT DOCUMENTS 6,222,452 B1 *  4/2001  Ahlstrom et al. .......... 340/572.1
8,120,540 B1 *  2/2012  Armstrong .................... 343/718
(Continued)

FOREIGN PATENT DOCUMENTS

WO    WO 2009/065074 A    5/2009

OTHER PUBLICATIONS

Gore et al. "Online calibration of floating gate detectors for RFID sensors", Circuits and Systems, 2005. 48th Midwest Symposium on Cinicinnati, Ohio; Aug. 7, 2005; 20050807-20050810 Piscataway, US, pp. 87-90.

(Continued)

Primary Examiner — Fekadeselassie Girma
(74) Attorney, Agent, or Firm — Jackson Patent Law Office

(57) ABSTRACT

The present invention relates to a strap device for a curtain or a flexible door, said straps having embedded RFID reader antenna modules and different MEMS and MOEMS sensors that make it possible to detect the direction of the objects passing through the gate and also detect the size of the objects so as to modulate the switching of the radiating elements of antennas on the basis of the position of the objects being read. The device also has embedded biosensors that measure in parallel the presence of toxic substances or materials. The device according to the invention has an LED or OLED and PHOLED display means embedded in the strap, more specifically, in a flexible material of the strap. The invention is particularly intended for the qualitative and quantitative traceability of materials passing through a logistical check gate. The device is intended for all places already having curtains with flexible straps, into which it is easily embedded. The device is suitable for all existing RFID readers.

13 Claims, 1 Drawing Sheet

(56) References Cited

U.S. PATENT DOCUMENTS

| | | | |
|---|---|---|---|
| 8,378,818 B2* | 2/2013 | Ruffle et al. | 340/552 |
| 8,384,521 B2* | 2/2013 | Matsen et al. | 340/10.1 |
| 2002/0089434 A1 | 7/2002 | Ghazarian | |
| 2004/0004577 A1* | 1/2004 | Forster | 343/866 |
| 2005/0140511 A1* | 6/2005 | Bonnell et al. | 340/572.7 |
| 2007/0155327 A1 | 7/2007 | Twitchell | |

OTHER PUBLICATIONS

"Screen Wipers Go Hi-Tech", Motorship, 20020101 Nexus Media Communications, Swanley, Kent, GB, vol. 83, Nr:978, p. 43, Jan. 1, 2002, XP 001089353.

International Search Report, Sep. 6, 2010, from International Phase of the instant application.

* cited by examiner

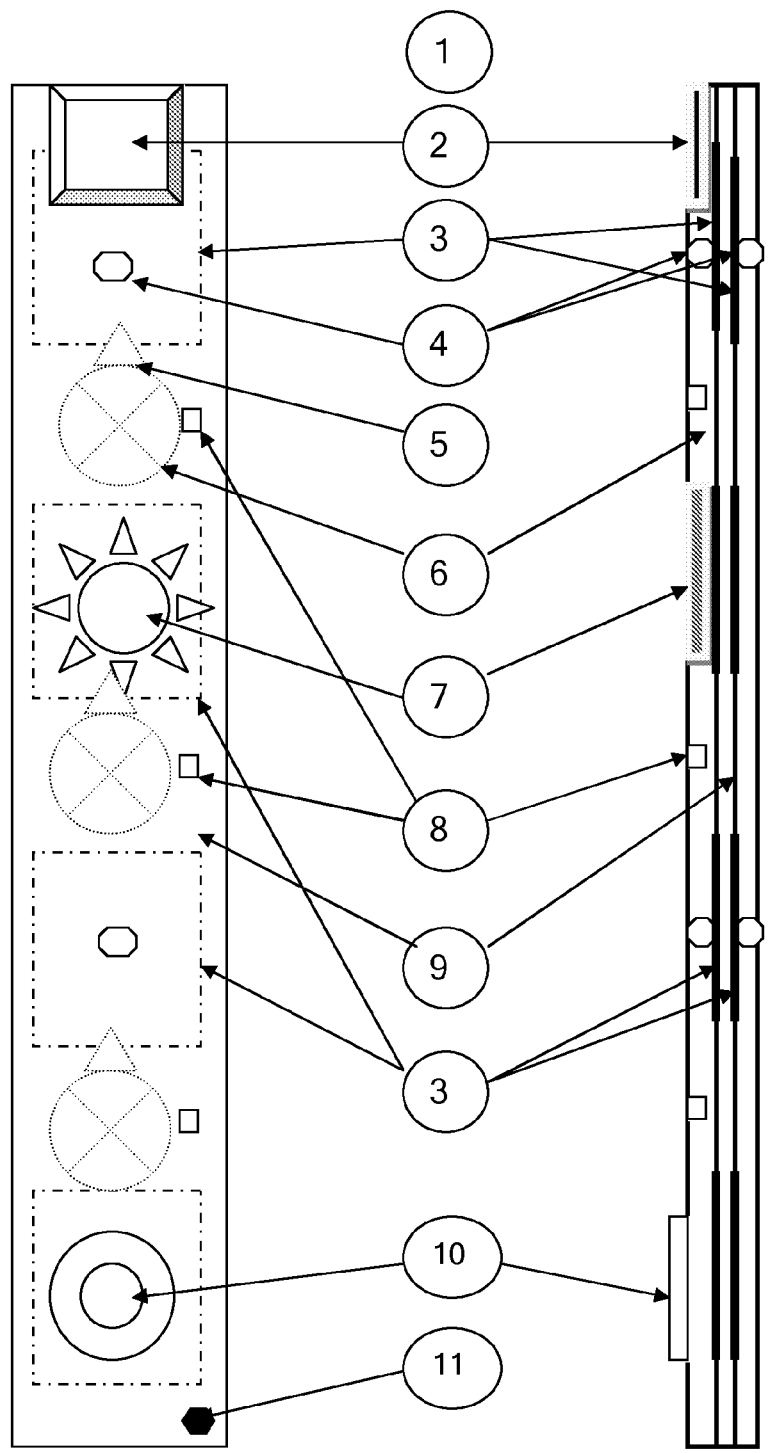

FLEXIBLE STRAPS HAVING EMBEDDED RFID READER ANTENNA MODULES

The present invention relates to flexible strips incorporating Radio Frequency Identification, commonly called RFID, reader antenna modules. These flexible strips used for separation curtain or door in the areas of storage (warehouses) or transport (transport vehicles) in the sector of logistics and of warehousing.

The device comprises a number of flexible strips used at the separation of different logistical passage and storage areas, on the one hand, and RFID antenna areas, on the other hand. The radiating elements of the antennas are incorporated into the core, made of flexible material, of each of the strips. Other sensors are arranged on the front and back of each of the strips in order to provide, on both sides, the management of the passage direction and thus provide the dual functionality of door and of RFID reader antenna to which the aforementioned antenna is associated. In an implementation mode, the antennas with flexible strips will incorporate biosensors that will be used to provide qualitative traceability of materials or objects stored on both sides of the strip curtain. In an implementation mode, the device incorporates OLED or PHOLED optical display modules, which enable indication of the quantitative and qualitative state of the passage transaction of the object at the level of the curtain. The device constitutes a network of RFID antennas, flexible and adapted to the size and number of transponders to be read.

More particularly, an object of the invention is a curtain or door device with flexible strips, characterized in that at least one strip comprises:
RFID reader antenna modules incorporated into the core of the strip, the aforementioned modules being distributed over the entire surface of the aforementioned strip,
optical detectors arranged in proximity to each of the antenna modules, the aforementioned detectors enabling detection of the presence of a package or a palette,
a heating core,
temperature sensors arranged on both sides of the strip,
power dividers and phase shifter circuits connecting the antenna modules to provide a complete distribution of the radiation field at each of the aforementioned modules,
MEMS or MOEMS sensors operating on the power dividers and phase shifter circuits,
a microelectronic management module incorporated into the strips and configured to:
perform automatic management of the field radiated by the antenna modules by providing the distribution of the radiating field to all the aforementioned antenna modules by:
monitoring, by means of the optical detectors, the presence of an object or a package next to each antenna module,
providing the switching of the power radiated by the means of MEMS or MOEMS sensors,
measure and regulate the temperature of the antenna modules, using respectively temperature sensors and the heating core,
a means to monitor the direction of passage of objects at the level of the curtain or the door,
a module to detect toxic or hazardous substances enabling detection of any product or substance to be monitored at the level of the curtain or door passage,
a LED, OLED or PHOLED display module enabling viewing of the state of the logistical transaction at the level of the curtain or door.

The development of logistics applications based on radio frequency identification technology (RFID), in particular in storage areas, involves the installation of gateways provided with reader antennas arranged around the gateway to generate a field capable of radiating in all directions in space in order to identify all the transponder populations that cross the gateway.

Existing antennas are generally constituted of radiators manufactured from a rigid substrate on which are engraved the various conductive elements forming the radiator and generally incorporated in a housing made of rigid insulation materials. The number of antennas installed in a gateway enables the reader to which they are associated to create a rotating field having quality proportional to the number of antennas. In the case of an unloading area such as a warehouse dock or tailgate of a transport vehicle, the juxtaposition of doors and associated antenna gateways involves a rational management of radiator installations on the gateways, on the one hand, and the management of switching times of each of the gateways, on the other hand. This in the principal goal to avoid radio interferences from a gateway antenna to the neighboring gateways.

There of course exist multiple multiplexing techniques for radiator and for gateways between themselves, in order to best limit the risk of interference of the gateways between themselves. Multiplexing solutions of each of the radiators involve the installation of complex management methods for the rotating field; the complexity of the multiplexing devices is often proportional to the surface and the organization of management of the physical flows of the storage area. It follows from this that the installation of a warehouse management device using RFID technology is often dependent on and limited in deployment to the judicious distribution of gateway antennas in the object passage area. It is the same for the loading docks that receive vehicles containing packages in bulk or in the form of pallets. In the specified case of package transport vehicles, a fundamental element of the traceability of the package results in the ability to accurately predict the direction of passage of the package at the level of the vehicle, from a logistical point of view, a fundamental parameter of the traceability consists of knowing precisely if a package is loaded or unloaded at a critical flow monitor point.

The person of skill in the art knows very well that the principal advantage of an RFID chip is to automatically respond to a magnetic or electromagnetic field when it is properly stimulated by the aforementioned fields. This technological advantage that is the principal attraction of RFID technology has its drawback in logistic applications, where the number of packages or objects as well as their passage direction must be precisely counted.

The other advantage of RFID technology resides the ability of a reader to read all at once a large population of RFID chips located in the field of the radiating antenna, this technical ability being limited by the capacity of the reader first to manage the duplicates of objects, and to verify the absence of objects due to poor magnetic or electromagnetic visibility of the RFID chip in the field of the reader. Another drawback of the antenna gateways implemented with conventional antennas lies during the passage of a palette of packages, or a pile of pallets (stacked) transported by a handling vehicle. According to the position of the forklift while passing under the gateway, it happens that certain packages are ignored by the RFID reader because their position relative to the field radiated by the antenna is in an electromagnetic shadow for the reader. This disadvantage is very common and difficult to manage for many pallets logistically stacked. Another problem of conventional RFID reader antenna to implement a passage gateway in a logistical warehouse is the degradation of their electromagnetic performance as a function of the ambient humidity and temperature.

Thus, numerous RFID driven applications have major difficulties to be deployed industrially due to the fact of the instability of performance in a real environment. Indeed, the propagation of an electromagnetic wave depends on the impedance of the medium through which it passes; the mathematical representation of a reader antenna is of the form ZA=RA+JXA if we consider an RFID chip antenna its impedance is modeled by the equation RC=ZC+JXC, the reading distance in a vacuum is modeled by the equation:

$$\mathcal{T} = \frac{\lambda}{4\pi}\sqrt{\frac{P_t G_t G_\mathcal{T} \mathcal{T}}{P_{th}}}$$

$\lambda$ being the operating frequency
$P_t$ is the power radiated by the antenna of the reader
$G_t$ is the gain of the antenna reader
$G_\tau$ is the gain of the antenna of the RFID TAG
$P_{th}$ is the minimum power of activation of the RFID TAG $$\mathcal{T} = \frac{4R_c R_a}{|Z_c + Z_a|^2}, \quad 0 \le \mathcal{T} \le 1$$

$\tau$ is the coefficient of power transmission between the RFID tag and the reader.

It will be noted that the maximum transmission efficiency is obtained when $\tau=1$ that is to say that the characteristic impedance of the TAG and of the reader antenna are equal to their characteristic impedance (generally 50Ω). The difficulty on the use of an RFID solution in a real environment is tied to the drifts of reactive parts of the impedances on both sides of the RFID link, depending on the nature of the electrical or electromagnetic environment (humidity, temperature, materials . . . ) it is very difficult for a simple antenna reader to effect the reading of a RFID TAG population according to their orientation in the fields of the antenna.

There also exists in logistics a latent need that comprises providing real time information on the state of the handling operation to the personnel dedicated to the handling of packages; for example during the loading of a truck or trailer it is imperative to know in real time if the loaded package is rogue or not. This valuable logistical information is a very important productivity gain and its installation in a logistics device is an important factor in reduction of financial losses due to rogue packages. One of the features, emerging from logistics, comprises monitoring in real time the quality of objects or of the storage environment of products. Indeed, in the face of the upsurge of acts of terrorism, the logistician function will have to rapidly integrate the function of quality control of transported substances and above all to be able to detect, in real time, the presence of a particular toxic substance, or a specifically hazardous product. These basic functions of the logistician will provide the quantitative and qualitative control of products transported or stored by him, will eventually require technical tools that will provide all these protections. Another drawback of the existing antenna devices is their low resistance to mechanical shocks inherent in the type of material handling in logistics. The high paces demanded in the logistics operations causes the handling personnel to not give great attention to the materials related to its activity and often the shocks on the products, particularly the gateways and associated antennas, are numerous and because of the fact of their rigidity they deteriorate.

The device according to the invention enables in a preferred implementation mode to meet all these logistical requirements. Indeed, a systemic analysis of a logistics chain indicates that the critical control points of the products are located at each of the passage doors that the product or package will cross, loading dock door, rolling vehicle door, refrigerating compartment door. All these required places of logistics and warehousing passage are generally provided with curtains having flexible strips. According to an implementation mode of the invention, it is in the body of the flexible strip that will be incorporated the RFID antenna modules.

FIG. 1) shows a front and sectional view of a model of implementation of a strip fitted with a network of RFID antennas into its core. Without being exhaustive this implementation mode relates to a mode of operation in the UHF range of RFID; the person of skill in the art will understand that the antenna modules (3) are patch type that is to say composed of a ground plane, a dielectric and a radiator. The radiators can be arranged on each side of the strip, in which case a single ground plane can be used for two aforementioned radiators. However, the method according to the invention is addressed to any type of RFID reader antenna module particularly HF or LF magnetic coupling antennas. In the implementation mode in the range of HF or LF, the antenna modules are the magnetically coupled loop type, without use of the ground plane.

The invention according to an implementation mode comprises a number of patch type radiating modules (3) incorporated into the core of the strip curtain. In this case, the heating core (9) also constitutes the ground plane.

The antenna modules (3) are judiciously distributed over the entire surface of the strip to enable the field (electric or magnetic) radiated by the reader, with which the antenna is associated, to be uniformly distributed over the entire height of the palette of products to be identified by the means of RFID TAGs.

The antenna modules (3) are interconnected between themselves via power dividers (5) and phase shifter circuits (6) which provide a complete distribution of the radiation field at each antenna module judiciously distributed over the entire surface of the flexible strip. The switching of the radiating field on each of the antenna modules (3) is effected using optical sensors (8), judiciously arranged in proximity to each of the antenna modules (3), on the one hand, and to MEMS or MOEMS sensors coupled to the different power dividers (5). This implementation mode enables, using optical sensors (8) incorporated into the strip, detection of the presence of a package or of a pallet by modulating and switching the radiation field on each antenna module (3) for which the optical detector (8) will have detected the presence of a package or a pallet.

The management of the automatic switching of the antenna modules (3) as well as the distribution of the radiation field will be provided by a microelectronic management module (2) arranged around a microcontroller or an ASIC that will independently provide the automatic management of all the reading and control members mounted on the strip.

In a preferred implementation mode of the invention the automatic management module (2) will be arranged around a micro module incorporating, on the one hand, a ZIGBEE or other protocol type radio frequency communication link, as well as all the means of technical management of the strip thus described. This management module (2), without being exhaustive in its implementation mode, will have the principal task of monitoring the direction of passage of the package or of the palette using movement detectors (4) incorporated into the strip and that will indicate to the module (2) its movement direction along the (X, Y, Z) axes. The management module (2) provides the distribution of the radiation field towards all the antenna modules (3) by, on the one hand, monitoring first the presence of a package or object next to each radiator, and providing the switching of the radiated power by means of the MEMS or MOEMS sensors arranged at the power dividers (5) incorporated into the strip.

The management module (2) also continually measures the temperature on each side of the strip using temperature sensors (11) arranged on each side of the strip. It also provides the regulation of the temperature of the strip by generating a heating current by the Peltier effect in the ground circuit of the antenna patches when the latter are inactive. In fact, in the case of UHF antenna modules (3), and when the strips are inactive, the ground plane is used as a heating or cooling element, by the means of the heating core (9). When the strips are active, the temperature regulation function of the ground plane is inhibited. In the case of non-UHF antenna modules (3), or in configurations without antennas, the heating core provides the regulation of the temperature. Thus during the entire rest phase of the strip, the radiators of the antennas are maintained at a constant temperature by the management module (2). The optimal temperature setting will be established for each antenna configuration and stored in the memory of the management module (2) that will also integrate the impedance values of the radiators with the values of the set temperature.

In order to enable the in situ visual monitoring of logistical operations at the level of the passage provided with strips according to the invention, these comprise a display module (7) that can be incorporated directly on the flexible substrate in the strip and be constituted based on LED, OLED or PHOLED or an autonomous display module built around a ZIGBEE microcontroller that it is fixed on the strip by any mechanical device known to the person of skill in the art and that enables its easy removal or fixation. In the two cases the display modules (7) are coupled to a management module (2), or a global computer device of the warehouse that individually addresses them to display any type of message or pictograms necessary to the smooth execution of the logistical transaction (hazardous material, temperature too high, rogue packages, missing, reader error . . . ). These displays can be fleeting or fixed for serious logistical faults. In the case of LED, PHOLED or OLED display module (7), the latter will be directly incorporated into the core of the strip in the form of a flexible substrate. In a preferred implementation mode of the display module (7), the latter will be manufactured by deposit of thin layers during the manufacture of different antenna modules (3) incorporated into the core of the strip. Thus equipped, the device according to this implementation mode of the invention enables selective monitoring of all the critical control points of the logistical warehouse and sending in real time vital data for the optimization of the logistics. Thus the invention when it is mounted in a truck trailer and enables in real time during loading to verify that there exists no rogue packages in the loading and it will be the same at the delivery.

In an implementation mode of the invention, it comprises a module (10) for detection of toxic or hazardous substances, constituted by biosensors and a microcontroller incorporating a communication protocol, preferably ZIGBEE or other, wherein is incorporated a biosensor that functions by parallel detection by a measure of the DNA of the substance to be tested. This real time analysis device is fixed in the core of the strip or directly incorporated into it in order to optimize the security of its functionality. The measurement probe is moveable and is constituted by laboratory on a chip that, on the one hand, enables characterization of the specific substance(s) to be monitored. The probe is also equipped with all means that enable identification and effectuation of its traceability (the date, the place, the nature of the detected substance). In an implementation mode, the detection module (10) will be capable of effectuating in real time the monitoring of safety limits and to send an anomaly message directly to the computer system of the warehouse or directly to the management module (2) to display locally on the display module (7).

In a more complex implementation mode of the invention, the detection module (10) is capable of making an in situ analysis in fluorescence mode and sending the optical matrices from the biochip to a high computation capacity processing system by means of its ZIGBEE connection.

The device as described is perfectly designed for real-time monitoring of the quantity and quality of products that pass at the monitor passage equipped with strips curtains.

In an implementation mode, the management module (2) only provides the functioning of all the functional elements incorporated into the strip and only handles the transparence of the analog antenna module (3); in this case the reader to which the strip is associated only sees the impedance of the antenna and it itself effects the detection of RFID tags that are presented in the field of the strip.

In a much more sophisticated implementation mode, the management module (2) effects, on the one hand, all the operations of the strip and also the digital processing of RFID tags using an assembly of components that effects the processing of the electric or magnetic field, as well as the digital decoding of RFID tags that are presented before the strip. This implementation mode is a RFID reader incorporated into the strip.

The invention proves to be quite adapted for implementing intelligent logistic gateways, that integrate, on the one hand, the possibility to identify all the RFID tags that are presented on each side of the strip. It also assures the passage direction of the passage of packages and palettes at the level of each critical control point. The invention is completely adapted to all the compartments or rolling vehicles that provide the transport of merchandise. In this implementation mode, the strips are mounted at the opening of the door of the transport compartment (truck, trailer, unloading dock, gateway . . . ) by means of its ZIGBEE connection the strip curtain sends to the warehouse storage computer the number and the nature of the products delivered or unloaded. The optimization of the logistical control can be graduated by the number and nature of the monitorings effected by the strip. Thus a curtain can be constituted by one or multiple strips according to the invention, each of the strips equippable with all or part of the functionalities described in the invention. In an implementation mode of the invention, the control members of the strip are supplied by a flexible solar cell incorporated into the strip, or any type of energy source providing its autonomy.

The strips of the device according to the invention can be made by deposit of thin metallic, dielectric, organic layers by cathodic sputtering or material spray or any other method enabling the piling of conductive or dielectric material on flexible substrate. The manufacturing process will enable the manufacturing of the antenna radiators and the PHOLED or OLED display elements.

In an implementation mode of the invention, the conductive inner layers can be transparent and conductive. The strip device according to the invention comprises all the connectors and accessories needed for its fixation and operation on the substrate of the curtain.

Each of the strips being completely independent, embedded software in the management module (2) enables association of one or multiple strips to a physical gateway address in order to avoid interference between multiple gateways. The number of strips according to the invention is between 1 and n strips according to the nature of the results to be attained. In the implementation mode of the invention where or the management module (2) is of the passive type, that is to say there exists no digital processing function of the RFID tags, it is the reader module to which it is associated that fixes, on the one hand, the number of strips to be handled. In this implementation mode the strip according to the invention is seen by the reader as a simple RFID antenna with its characteristic impedance. The management module (2) automatically handles in this case all the other basic functions of the device according to the invention.

The device in this implementation mode is adapted to all the existing RFID readers operating with standards established by regulation; it is mechanically fixed by means of a device judiciously adapted for this purpose (1) and incorporates all the electrical connectors necessary for the device according to the invention.

LIST OF REFERENCES FIG. 1

1 Device for mechanical attachment and electrical connections
2 Microelectronics management module of the strip
3 Antenna radiators
4 Movement detectors
5 MEMS power divider circuits
6 Phase change circuit
7 LED, OLED, PHOLED display module
8 MOEMS object detectors
9 Metallic heating core of the strip
10 Bio sensor measurement module
11 Temperature detector

The invention claimed is:

1. Curtain or door device comprising a plurality of flexible strips, a strip in the plurality of flexible strips, comprising:
RFID reader antenna modules incorporated into the core of the strip, the aforementioned antenna modules being distributed over the entire surface of the aforementioned strip,
optical detectors arranged in proximity to each of the antenna modules, the aforementioned optical detectors enabling detection of the presence of a package or object,
a heating core,
temperature sensors arranged on both sides of the strip,
power dividers and phase shifter circuits connecting the antenna modules to provide a complete distribution of the radiation field at each of the aforementioned modules,
Micro-Electro-Mechanical Systems (MEMS) or Micro-Opto-Electro-Mechanical Systems (MOEMS) sensors operating on the power dividers and phase shifter circuits,
a microelectronic management module incorporated into the strips and configured to:
perform automatic management of the field radiated by the antenna modules by providing the distribution of radiating field to all the aforementioned antenna modules by:
monitoring, by the optical detectors, the presence of an object or a package next to each antenna module,
effectuating the switching of the power radiated by the MEMS or MOEMS sensors,
measure and regulate the temperature of the antenna modules, using respectively temperature sensors and the heating core,
a monitor to detect the direction of passage of objects at the level of the curtain or door,
a module to detect toxic or hazardous substances enabling detection of any product or substance to be monitored at the level of the curtain or door,
a light-emitting diodes (LED), organic light-emitting diode (OLED) or Phosphorescent organic light-emitting diodes (PHOLED) display module enabling viewing of the state of the logistical transaction at the level of the curtain or door.

2. The device according to claim 1, wherein one or multiple modules for detection of toxic or hazardous substances comprising a microcontroller incorporating a radio communication member wherein is incorporated a bio sensor or bio sensors operating by parallel detection of DNA of the substance to be monitored.

3. The device according to claim 2, wherein the modules for detection are mechanically fixed in the core of the strip or directly incorporated therein.

4. The device according to claim 2, wherein the bio-sensors are removable and comprise all the specific substance or substances to be monitored, and equipped to enable their identification and provide their traceability.

5. The device according to claim 1, wherein the microelectronic management module is provided with a radio communication member enabling communication with the strips of the curtain and effectuating all the transactions relating to the state of the logistical transaction at the level of the aforementioned curtain.

6. The device according to claim 5, wherein the microelectronics management module is configured to receive and send any type of transaction state on the strip to a remote computer system.

7. The device according to claim 5, wherein the microelectronic management module incorporates a digital processing member having RFID chips processed by the antenna modules, a switching and management of the aforementioned antenna radiators enabling an RFID reader to see the one or more strip as an RFID reader antennas.

8. The device according to claim 1, further comprising: an autonomous electrical supply of the photovoltaic type incorporated or attached to the strip, battery pack or electrical connector attached on the curtain and used in the operation of the aforementioned device in active mode.

9. The device according to claim 1, wherein control members of the strip are supplied by a flexible solar cell incorporated into the strip, or any type of energy source providing its autonomy.

10. The device according to claim 1, wherein the management module effectuates the regulation of the temperature so that
when the strips are inactive, the ground plane is used as a heating or cooling element, by the heating core,
when the strips are active, the temperature regulation function of the ground plane is inhibited.

11. The device according to claim 1, wherein the management module is configured to activate or to deactivate each function of the strip.

12. The device according to claim 1, wherein the management module is configured to display, by radio pathway, logistical or security messages on the display module or reconstruct safety quality risk data from the bio sensors mounted on the strip.

13. The device according to claim 1, wherein the strips are made by deposit of thin metallic, dielectric, organic layers by cathodic sputter or material spray or any other method enabling the piling of conductive or dielectric material on flexible substrate.

* * * * *